(12) United States Patent
Fluhr et al.

(10) Patent No.: US 12,192,676 B1
(45) Date of Patent: Jan. 7, 2025

(54) PRODUCING AND VIEWING VIDEO-BASED GROUP CONVERSATIONS

(71) Applicant: VideoLabs, Inc., San Carlos, CA (US)

(72) Inventors: Jeff Fluhr, San Francisco, CA (US); Robert Hunt, San Francisco, CA (US)

(73) Assignee: VideoLabs, Inc., Palo Alto, CA (US)

( * ) Notice: Subject to any disclaimer, the term of this patent is extended or adjusted under 35 U.S.C. 154(b) by 20 days.

(21) Appl. No.: 16/286,993

(22) Filed: Feb. 27, 2019

Related U.S. Application Data

(63) Continuation of application No. 14/946,627, filed on Nov. 19, 2015, now abandoned, which is a
(Continued)

(51) Int. Cl.
*H04N 7/15* (2006.01)
*G06F 3/0482* (2013.01)
*G06F 3/04842* (2022.01)
*G06F 3/04847* (2022.01)
*H04L 65/1069* (2022.01)
*H04L 65/1093* (2022.01)
*H04L 65/403* (2022.01)

(52) U.S. Cl.
CPC .......... *H04N 7/152* (2013.01); *G06F 3/0482* (2013.01); *G06F 3/04842* (2013.01); *G06F 3/04847* (2013.01); *H04L 65/1069* (2013.01); *H04L 65/1093* (2013.01); *H04L 65/403* (2013.01); *H04N 7/155* (2013.01)

(58) Field of Classification Search
CPC ...... H04N 7/152; H04N 7/155; H04L 65/403; H04L 65/1069; H04L 65/1093; G06F 3/04842; G06F 3/0482; G06F 3/04847
See application file for complete search history.

(56) References Cited

U.S. PATENT DOCUMENTS 5,473,367 A 12/1995 Bales et al.
5,867,653 A 2/1999 Aras et al.
(Continued)

FOREIGN PATENT DOCUMENTS

WO WO-2012091536 A1 * 7/2012 ............. H04N 7/141

OTHER PUBLICATIONS

"U.S. Appl. No. 14/063,848, Non Final Office Action mailed May 21, 2015", 19 pgs.
(Continued)

*Primary Examiner* — Tan H Tran
(74) *Attorney, Agent, or Firm* — Workman Nydegger

(57) ABSTRACT

A system and method for producing a video-based group conversation for viewing over a network. The system is configured to generate a display at a first user computer which includes a plurality of sections in a single screen display, including at least a preview section configured for displaying an indicator for each of one or more viewers who are viewing the video-based conversation, and a media player section configured for displaying a video signal including at least some of the video feeds. The creator of the video-based group conversation controls which users can participate in the video-based group conversation by enabling video feeds provided by those users to be displayed on the screen and viewable to other users who access the group conversation.

20 Claims, 15 Drawing Sheets

Related U.S. Application Data continuation of application No. 14/923,097, filed on Oct. 26, 2015, now abandoned, which is a continuation of application No. 14/063,848, filed on Oct. 25, 2013, now Pat. No. 9,191,618.

(60) Provisional application No. 61/718,994, filed on Oct. 26, 2012.

(56) References Cited

U.S. PATENT DOCUMENTS

| | | | |
|---|---|---|---|
| 6,823,363 B1 | 11/2004 | Noveck et al. | |
| 6,839,080 B2 | 1/2005 | Meyers | |
| 8,514,265 B2 | 8/2013 | Goyal et al. | |
| 8,593,505 B2 | 11/2013 | Forkner et al. | |
| 8,693,648 B1 | 4/2014 | Drugge et al. | |
| 9,001,178 B1 | 4/2015 | Leske et al. | |
| 9,191,618 B2 | 11/2015 | Fluhr et al. | |
| 9,264,660 B1 | 2/2016 | Petterson et al. | |
| 9,277,177 B2* | 3/2016 | Ramadass | H04N 7/144 |
| 9,325,940 B2 | 4/2016 | Smelyansky | |
| 9,451,211 B1 | 9/2016 | Fluhr et al. | |
| 9,462,231 B1 | 10/2016 | Fluhr et al. | |
| 9,628,759 B1 | 4/2017 | Fluhr et al. | |
| 9,693,018 B1 | 6/2017 | Fluhr et al. | |
| 9,693,019 B1 | 6/2017 | Fluhr et al. | |
| 9,693,020 B1 | 6/2017 | Fluhr et al. | |
| 2001/0044725 A1 | 11/2001 | Matsuda et al. | |
| 2002/0085030 A1 | 7/2002 | Ko et al. | |
| 2004/0047461 A1* | 3/2004 | Weisman | H04M 3/567 379/202.01 |
| 2005/0264648 A1* | 12/2005 | Ivashin | H04N 7/152 348/14.09 |
| 2006/0050658 A1 | 3/2006 | Shaffer et al. | |
| 2006/0164507 A1* | 7/2006 | Eshkoli | H04N 7/152 348/14.09 |
| 2006/0184624 A1 | 8/2006 | Thukral | |
| 2007/0208806 A1 | 9/2007 | Mordecai et al. | |
| 2008/0059580 A1 | 3/2008 | Kalinowski et al. | |
| 2009/0015659 A1 | 1/2009 | Choi | |
| 2010/0005402 A1 | 1/2010 | George et al. | |
| 2010/0128103 A1 | 5/2010 | Sim et al. | |
| 2011/0019662 A1* | 1/2011 | Katis | H04L 65/1083 370/352 |
| 2011/0072366 A1* | 3/2011 | Spencer | G06F 3/0486 715/757 |
| 2011/0093784 A1 | 4/2011 | Kiraz et al. | |
| 2011/0145881 A1 | 6/2011 | Hartman et al. | |
| 2011/0217021 A1* | 9/2011 | Dubin | H04N 7/15 386/278 |
| 2011/0267419 A1 | 11/2011 | Quinn et al. | |
| 2011/0279638 A1 | 11/2011 | Periyannan et al. | |
| 2011/0283203 A1* | 11/2011 | Periyannan | H04N 7/141 715/753 |
| 2011/0286716 A1 | 11/2011 | Alderson | |
| 2012/0078726 A1* | 3/2012 | Black | G06Q 50/01 705/14.66 |
| 2012/0254305 A1* | 10/2012 | Malkin | G06Q 10/1095 709/204 |
| 2012/0268553 A1 | 10/2012 | Talukder et al. | |
| 2012/0287224 A1 | 11/2012 | Paris | |
| 2012/0290978 A1* | 11/2012 | Devecka | G06Q 30/0277 715/810 |
| 2013/0036168 A1 | 2/2013 | Upton et al. | |
| 2013/0057639 A1 | 3/2013 | Ralston | |
| 2013/0070045 A1 | 3/2013 | Meek | |
| 2013/0239024 A1 | 9/2013 | Lewis et al. | |
| 2013/0312041 A1 | 11/2013 | Gresta | |
| 2014/0118474 A1 | 5/2014 | Fluhr et al. | |

OTHER PUBLICATIONS

"U.S. Appl. No. 14/063,848, Notice of Allowance mailed Oct. 6, 2015", 7 pgs.

"U.S. Appl. No. 14/063,848, Response filed Apr. 20, 2015 to Restriction Requirement mailed Mar. 18, 2015", 10 pgs.

"U.S. Appl. No. 14/063,848, Response filed Aug. 20, 2015 to Non Final Office Action mailed May 21, 2015", 15 pgs.

"U.S. Appl. No. 14/063,848, Restriction Requirement mailed Mar. 18, 2015", 5 pgs.

"U.S. Appl. No. 14/942,778, Non Final Office Action mailed Jul. 8, 2016", 8 pgs.

"U.S. Appl. No. 14/942,778, Notice of Allowance mailed Aug. 29, 2016", 12 pgs.

"U.S. Appl. No. 14/942,778, Response filed Jul. 8, 2016 to Non Final Office Action mailed Jul. 8, 2016", 10 pgs.

"U.S. Appl. No. 14/942,783, Non Final Office Action mailed Jul. 15, 2016", 23 pgs.

"U.S. Appl. No. 14/942,783, Non Final Office Action mailed Dec. 16, 2016", 19 pgs.

"U.S. Appl. No. 14/942,783, Notice of Allowance mailed May 11, 2017", 5 pgs.

"U.S. Appl. No. 14/942,783, Response filed Apr. 10, 2017 to Non Final Office Action mailed Dec. 16, 2016", 16 pgs.

"U.S. Appl. No. 14/942,783, Response filed Nov. 11, 2016 to Non Final Office Action mailed Jul. 15, 2016", 14 pgs.

"U.S. Appl. No. 14/942,788, Non Final Office Action mailed Jul. 1, 2016", 7 pgs.

"U.S. Appl. No. 14/942,788, Notice of Allowance mailed Aug. 12, 2016", 12 pgs.

"U.S. Appl. No. 14/942,788, Response filed Jul. 6, 2016 to Non Final Office Action mailed Jul. 1, 2016", 9 pgs.

"U.S. Appl. No. 14/942,791, Non Final Office Action mailed Jul. 6, 2016", 7 pgs.

"U.S. Appl. No. 14/942,791, Non Final Office Action mailed Aug. 11, 2016", 14 pgs.

"U.S. Appl. No. 14/942,791, Non Final Office Action mailed Dec. 15, 2016", 15 pgs.

"U.S. Appl. No. 14/942,791, Notice of Allowance mailed May 10, 2017", 5 pgs.

"U.S. Appl. No. 14/942,791, Response filed Apr. 10, 2017 to Non Final Office Action mailed Dec. 15, 2016", 14 pgs.

"U.S. Appl. No. 14/942,791, Response filed Jul. 6, 2016 to Non Final Office Action mailed Jul. 6, 2016", 12 pgs.

"U.S. Appl. No. 14/942,791, Response filed Nov. 8, 2016 to Non Final Office Action mailed Aug. 11, 2016", 12 pgs.

"U.S. Appl. No. 14/942,793, Non Final Office Action mailed Jan. 3, 2017", 16 pgs.

"U.S. Appl. No. 14/942,793, Non Final Office Action mailed Jul. 15, 2016", 7 pgs.

"U.S. Appl. No. 14/942,793, Non Final Office Action mailed Aug. 3, 2016", 14 pgs.

"U.S. Appl. No. 14/942,793, Notice of Allowance mailed May 5, 2017", 5 pgs.

"U.S. Appl. No. 14/942,793, Preliminary Amendment filed Jul. 6, 2016", 10 pgs.

"U.S. Appl. No. 14/942,793, Response filed Apr. 10, 2017 to Non Final Office Action mailed Jan. 3, 2017", 16 pgs.

"U.S. Appl. No. 14/942,793, Response filed Jul. 19, 2016 to Non Final Office Action mailed Jul. 15, 2016", 14 pgs.

"U.S. Appl. No. 14/942,793, Response filed Nov. 1, 2016 to Non Final Office Action mailed Aug. 3, 2016", 13 pgs.

"U.S. Appl. No. 14/942,793, Response filed Nov. 2, 2016 to Non Final Office Action mailed Aug. 3, 2016", 13 pgs.

"U.S. Appl. No. 14/942,793, Supplemental Amendment filed Nov. 16, 2016", 13 pgs.

"U.S. Appl. No. 14/942,795, Non Final Office Action mailed Jul. 1, 2016", 7 pgs.

"U.S. Appl. No. 14/942,795, Non Final Office Action mailed Jul. 28, 2016", 10 pgs.

"U.S. Appl. No. 14/942,795, Notice of Allowance mailed Jan. 3, 2017", 5 pgs.

"U.S. Appl. No. 14/942,795, Response filed Jul. 6, 2016 to Non Final Office Action mailed Jul. 1, 2016", 14 pgs.

"U.S. Appl. No. 14/942,795, Response filed Nov. 28, 2016 to Non Final Office Action mailed Jul. 28, 2016", 13 pgs.

(56) References Cited

OTHER PUBLICATIONS

"U.S. Appl. No. 14/946,627, Final Office Action mailed Aug. 29, 2018", 22 pgs.
"U.S. Appl. No. 14/946,627, Non Final Office Action mailed Feb. 26, 2018", 25 pgs.
"U.S. Appl. No. 14/946,627, Response filed May 22, 2018 to Non Final Office Action mailed Feb. 26, 2018", 16 pgs.
U.S. Appl. No. 14/063,848 U.S. Pat. No. 9,191,618, filed Oct. 25, 2013, Method and System for Producing and Viewing Video-Based Group Conversions.
U.S. Appl. No. 14/923,097, filed Oct. 26, 2015, Producing and Viewing Video-Based Group Conversions.
U.S. Appl. No. 14/946,627, filed Nov. 19, 2015, Producing and Viewing Video-Based Group Conversions.
U.S. Appl. No. 14/942,778 U.S. Pat. No. 9,462,231, filed Nov. 16, 2015, Producing and Viewing Video-Based Group Conversions.
U.S. Appl. No. 14/942,788 U.S. Pat. No. 9,451,211, filed Nov. 16, 2015, Producing and Viewing Publically Viewable Video-Based Group Conversions.
U.S. Appl. No. 14/942,795 U.S. Pat. No. 9,628,759, filed Nov. 16, 2015, Producing and Viewing Publically Viewable Video-Based Group Conversions.
U.S. Appl. No. 14/942,783 U.S. Pat. No. 9,693,019, filed Nov. 16, 2015, Producing and Viewing Video-Based Group Conversions.
U.S. Appl. No. 14/942,791 U.S. Pat. No. 9,693,018, filed Nov. 16, 2015, Producing and Viewing Publically Viewable Video-Based Group Conversions.
U.S. Appl. No. 14/942,793 U.S. Pat. No. 9,693,020, filed Nov. 16, 2015, Producing and Viewing Publically Viewable Video-Based Group Conversions.

* cited by examiner

PRODUCING AND VIEWING VIDEO-BASED GROUP CONVERSATIONS

CROSS-REFERENCE

This application is a continuation of U.S. application Ser. No. 14/946,627, filed Nov. 19, 2015, which is a continuation of U.S. application Ser. No. 14/923,097, filed Oct. 26, 2015, which is a continuation of U.S. application Ser. No. 14/063,848, filed Oct. 25, 2013, which claims priority from U.S. Provisional Patent Application No. 61/718,994 filed Oct. 26, 2012, all of which are incorporated herein by reference in their entirety.

TECHNICAL FIELD

This disclosure relates generally to the field of signal processing, and more particularly, to a system and method for creating and producing a video-based group conversation over the Internet.

BACKGROUND

Video conferencing is generally known in which two or more locations communicate with each other by simultaneous two-way video and audio transmission. For example, GoToMeeting, WebEx and Skype are popular commercial services where group video conferences can be conducted online for anyone with an Internet connection. However, these video conferencing services do not permit live public viewing of the video conferences—only invitees may participate. Skype is sometimes used in conjunction with public television broadcasts, but it is used as a video source only and thus does not allow television viewers to join on air. GoToMeeting, WebEx and Skype also require additional client software as opposed to working entirely within a web or mobile browser. Generally, such video conferencing services also limit the number of participants to hundreds or low thousands of viewers.

Other video conferencing services, like Google Hangouts and Tinychat, do allow public viewing, but lack a robust set of production tools for controlling the creation and production of the live video session and/or lack the ability for viewers to interact. Google Hangouts, for example, allows a large audience of off-camera viewers but they are not able to join the video conversation on camera, participate in text chat, or share media such as photos, recorded videos or slide decks.

It would thus be desirable if a video conferencing service allowed for tens of thousands of viewers to participate in a public group-based video conversation and provided a full set of production controls that enabled any user of the service to create and produce a group-based video conversation consisting of multiple video and audio streams that may be selected to be on camera by a producer.

DETAILED DESCRIPTION

1. Overview

Figure 1:
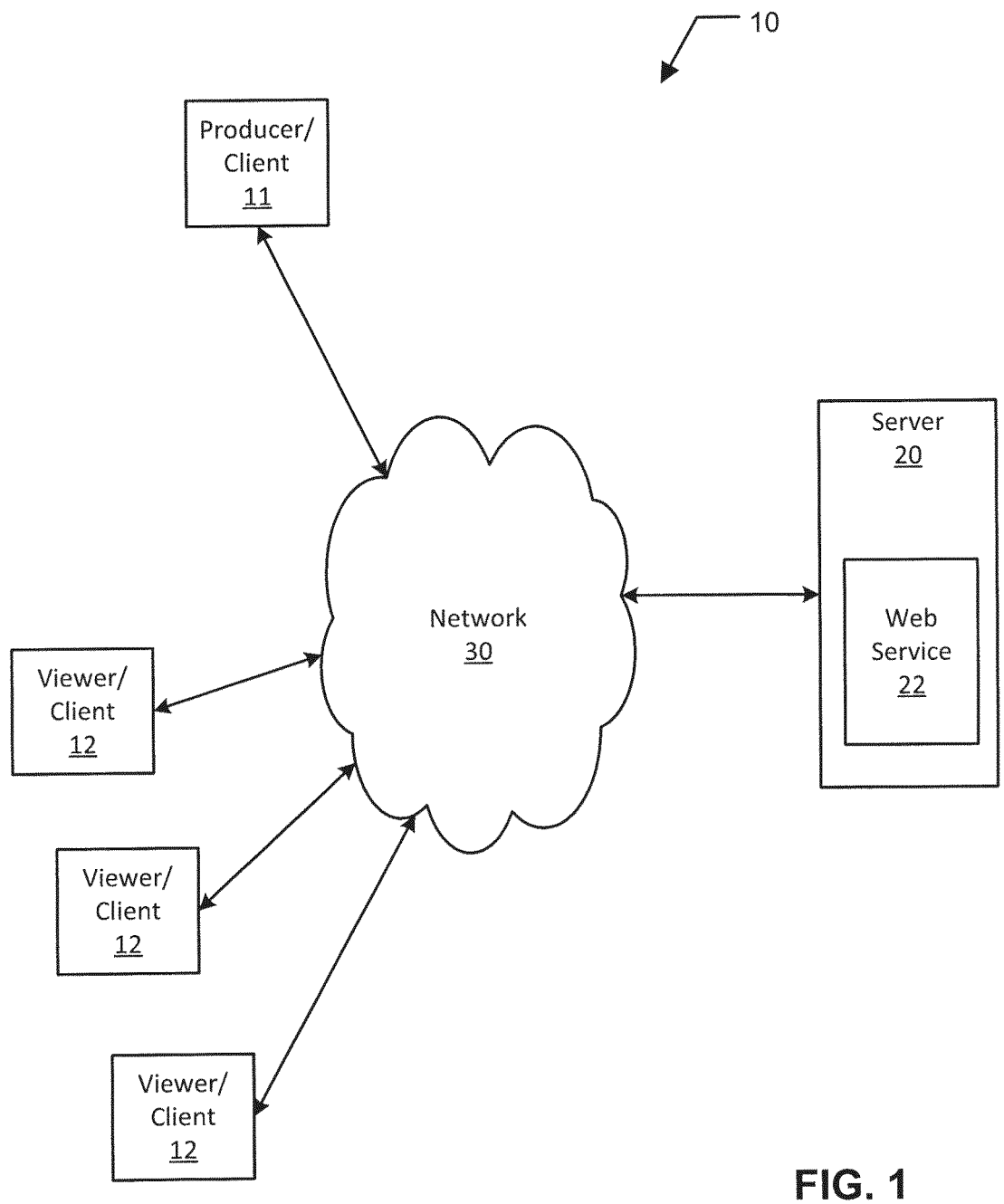
FIG. 1 is a block diagram of a system for producing a video-based group conversation.

This disclosure is directed to systems and methods for creating and producing a video-based group conversation over a network, such as the Internet, and for making the group conversations discoverable, searchable and accessible over the network. Referring to FIG. 1, a typical client/server computing environment 10 is illustrated in which a number of client computers 11, 12 are coupled to a server computer 20 via a computer network 30. The client computers 11, 12 and the server computer 20 may be conventional computing devices, such as a desktop computer, laptop computer, smartphone, tablet, etc.

As described more particularly below, the server computer 20 hosts a web service 22 that provides a software platform having one or more application programs that users of the client computers 11, 12 can access for creating, viewing, and/or participating in a video-based group conversation. Advantageously, the web conversation event can be viewed live and in real-time over the network 30 and/or also recorded and stored for viewing at a later time or upon request by a user. Further, the creator can choose to make the video-based group conversation public, private or unlisted. If the creator chooses to make the video-based group conversation public, it will be discoverable, for example, through a user's search results, a directory of public conversations, etc., and accessible, for example, through a URL accessible in a web browser, screen in a mobile app, etc. Audio and video streams may be transmitted using HTTP protocol or UDP protocol.

In one embodiment, the user who creates a video-based group conversation is, by default, designated the "creator." However, the creator may also designate one or more other users as co-producer with a full or limited set of producer tools to facilitate producing the video-based group conversation. The creator or co-producer may designate the video-based group conversation as "public" so that the video-based group conversation is accessible to any user, and the event can be logged to a public directory or otherwise made searchable. Alternatively, the conversation may be designated as "private" so that only invited users can access and view it, or "unlisted" so that access is limited to only those users who know the URL.

The subject matter described herein may be computer-implemented in a suitable system by providing computer-executable instructions stored on a non-transitory computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic energy, radio frequency signals, acoustic or light waves, such as those generated during radio wave and infrared data communications.

For example, a binary machine-executable version of software instructions for providing the features described herein may be stored or reside in RAM or cache memory, or on a mass storage device. The source code of the software may also be stored or reside on a mass storage device (e.g., hard disk, magnetic disk, tape or CD-ROM). As a further example, software code may be transmitted via wires or radio waves, or downloaded through a network such as the Internet.

Computer software products may be written in any of various suitable programming languages, such as Ruby, Go, C, C++, C#, Pascal, Fortran, Perl, Matlab (from MathWorks), SAS, SPSS, JavaScript, ActionScript, AJAX, Java, SQL, and XQuery. A computer software product may be an independent application with data input and data display modules. Alternatively, computer software products may be classes that are instantiated as distributed objects, or component software such as Java Beans or Enterprise Java Beans (both by Oracle Corporation). In one embodiment, the subject matter described herein is embodied as a computer program product that stores instructions, such as computer code, that when executed by a computer, cause the computer to perform the processes and/or techniques described below.

The server computer 20 and each client computer 11, 12 run an operating system (OS) to manage hardware resources and provide common application services for application software. As an example, the server computer 20 may run a Microsoft Windows® operating system (e.g., Windows NT, Windows XP, Windows Vista, Windows 7, Windows CE, Windows Mobile), or Linux®, UNIX®, Sun® OS, Solaris®, Mac® OS X, Alpha® OS, AIX, IRIX® 32, or IRIX® 64. Other operating systems may also be used. Also by way of example, the client computers, which can be mobile devices, may run an Apple operating system (Mac OS X, iOS), a Google operating system (Android, Chromium), a Windows operating system (Windows 8, Windows 7, etc.) or a Linux or Unix operating system.

2. Creating the Video-Based Group Conversation

Figure 2:
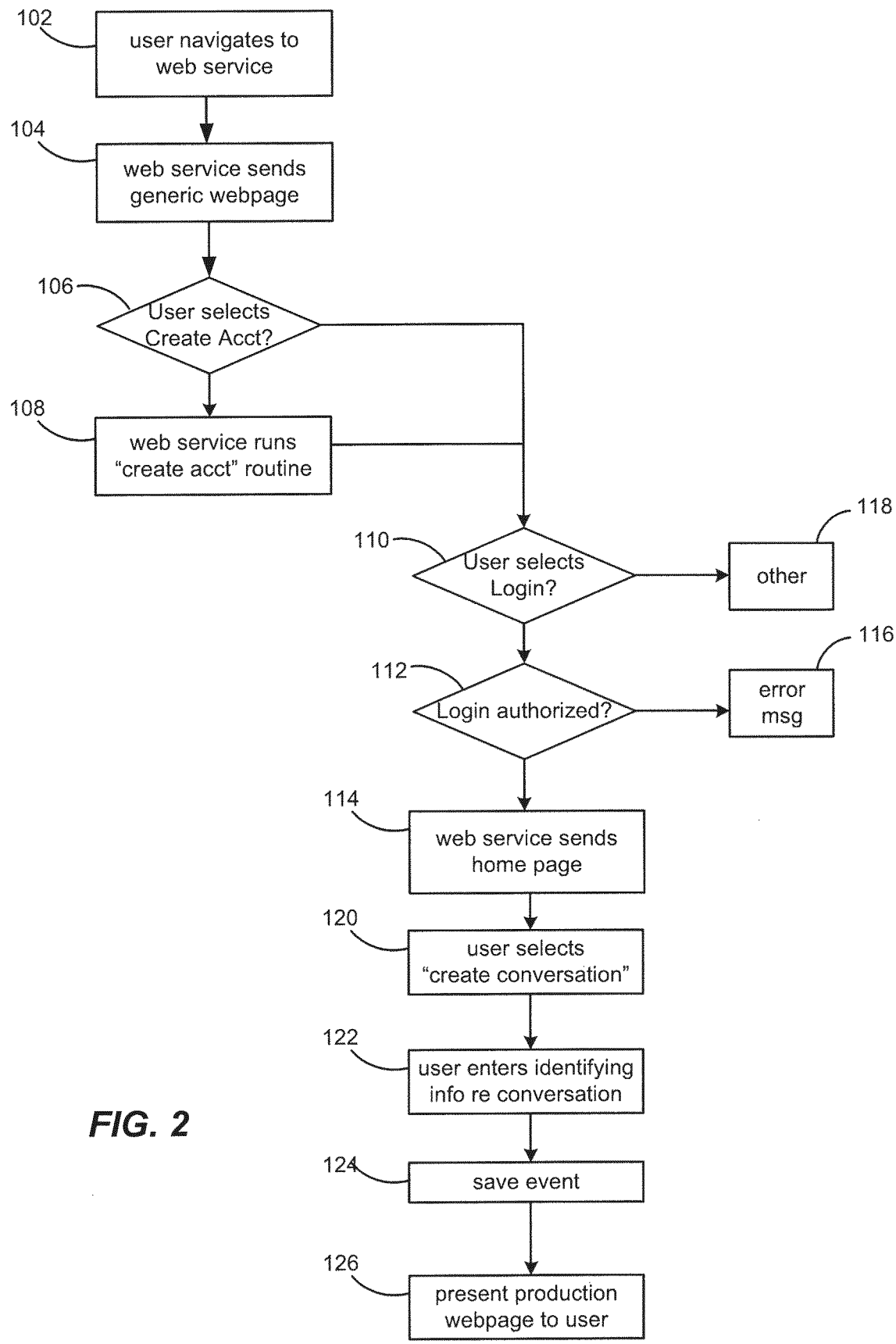
FIG. 2 is a flow chart of a method for creating a video-based group conversation.

A method 100 for creating a video-based group conversation having multiple viewers and participants using a web-based service 22 is illustrated in FIG. 2. In step 102, a user desiring to create a video-based group conversation navigates to a specific web address for such service 22, for example, using a browser program on a computing device. In the example described herein, a browser program is used to navigate to a web site, but the same functionality can be achieved through a customized application installed on a mobile computing device. The web address is a URL that locates the website hosting the web-based service 22. For example, a commercial embodiment of the web-based service 22 and method 100 has been implemented by Spreecast, Inc., of San Francisco, California, at the web address www.spreecast.com. Examples of browser programs include the Firefox browser by Mozilla Foundation, the Internet Explorer browser by Microsoft Corporation, the Chrome browser by Google, the Safari browser, the mobile versions of the above browsers and others. As noted above, accessibility to the live and recorded video-based group conversations can also be delivered directly through a mobile application and installed on a mobile computing device.

Upon the user navigating to the website, in step 104, the web service 22 transmits a generic webpage to the user for display on the user's computing device 12. As is typical for web-based services, the generic webpage includes among other features a first link or button for existing users of the web service to select for logging into the web service 22, and a second link or button for new users to register with the web service. Each link or button initiates a programmed routine for user interaction with the service 22. It should be noted that while the systems and methods described herein utilize graphical user interfaces to interact with users in well-known manner, and while specific functional widgets are described, such as links, buttons, forms, tabs, pop-up dialogs, web pages, pull-down menus, etc., the desired functionality can be implemented in many different ways with different types of widgets and applications, and the description of a particular widget should be considered merely exemplary and not limiting. As such, the above example could also have been implemented in a mobile application instead of a browser-based application with mobile screens instead of browser-based webpages.

If the user selects the link to register with the web-based conferencing service 22 in step 106, then the service performs a routine in step 108 to create an account for the new user. The new user may be presented with a pop-up dialog or a new webpage to create the new account including a corresponding user profile with the web service. The account and user profile may be created in one of several ways. For example, the user may be shown a predefined form that requests specific required and/or optional information from the user. Alternatively, and preferably, the user may be given the option to import authentication and profile information from another existing source account, such as social media sites like Facebook or Twitter, or a pre-existing email account of the user. In that case, the user may be shown a webpage or a pop-up dialog that asks for the login information for the chosen source account, if the user is not already logged into the source account. As is common, the user's login credentials, e.g., a user ID and password, may be saved by the service at the option of the user. A user may also create an account from a mobile application or an application on any computing device.

If the user is an existing user of the web service 22, or a new user having completed creating an account with the service, the login link may be selected in step 110. If the proper login credentials are presented to the web service 22 in step 112, either from direct entry by the user, or by importing from another source account, the user is directed to a home page that may be customized by or for the user in step 114. If the proper login credentials are not presented to the web service 22 in step 112, then an error message is generated in step 116. If the user has not chosen to create a new account in step 106, or login in step 110, then other content and links may be made available to the user on the generic web page in step 118. For example, other video-based group conversations may be listed and featured, or a search widget may be provided to enable keyword-based searching for public video-based group conversations that relate to specific topics, people, events, etc.

Figure 3A:
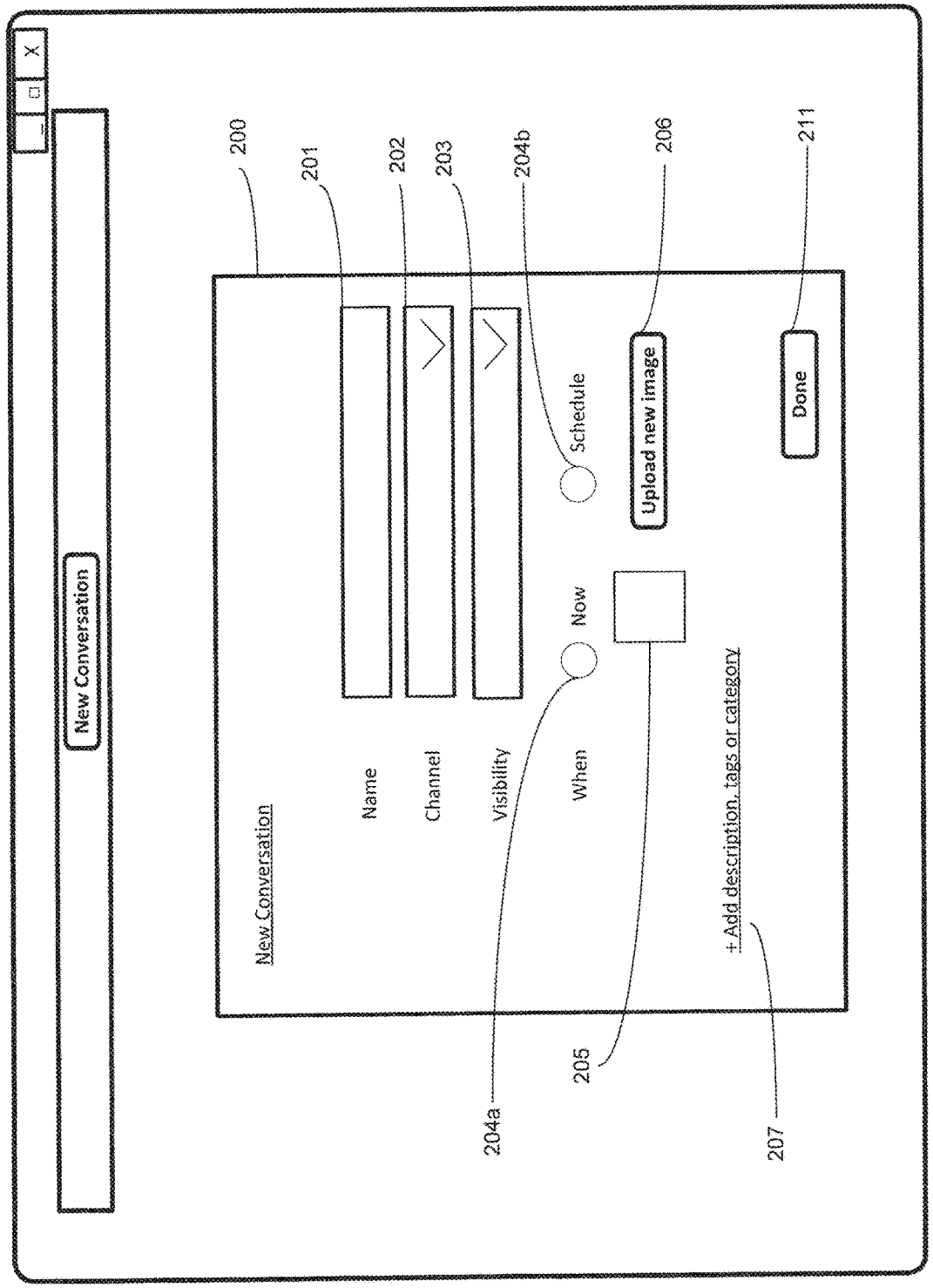
FIG. 3A illustrates a web page for entering identifying information about a video-based group conversation.

In step 120, the user who wishes to initiate a video-based group conversation (called the "creator") selects a link or button on the customized home page which is configured to initiate the creation of a new video-based group conversation. In one embodiment, in response to the selection of the link or button on the home page, the web-based conferencing service 22 may generate a dialog box 200 as a pop-up window with defined data fields, for example, as shown in FIG. 3A. Alternatively, a new web page may be presented to the user rather than a pop-up dialog. In step 122, the creator enters basic identifying information about the video-based group conversation into defined data fields of the dialog box 200 of FIG. 3A. For example, the defined data fields may include data entry field 201, where the producer can enter a name for the video-based group conversation; pull-down data field 202, where the producer can select an existing channel or define a new channel for the video-based group conversation; pull-down data field 203, where the creator can select the visibility of the video-based group conversation, e.g., public, private, or unlisted; and a pair of widgets 204a and 204b, where the creator can schedule the video-based group conversation now by selecting widget 204a, or at a later date and time by selecting widget 204b. If the creator selects widget 204b, then another pop-up dialog can be presented (not shown) to allow the creator to select a later date and/or time for the video-based group conversation.

Figure 3B:
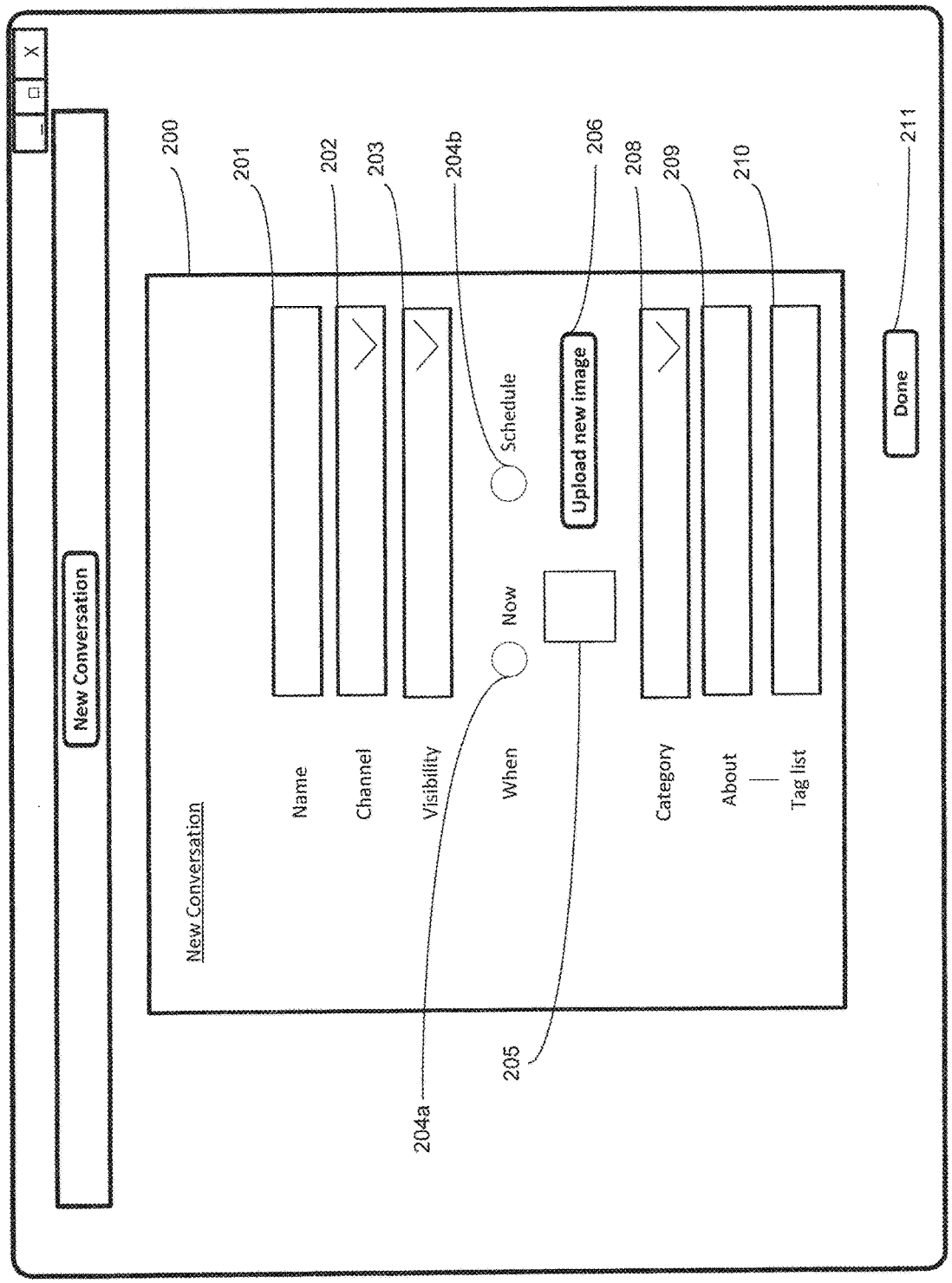
FIG. 3B illustrates the web page of FIG. 3A expanded to enter additional identifying information about the video-based group conversation.
Figure 4A:
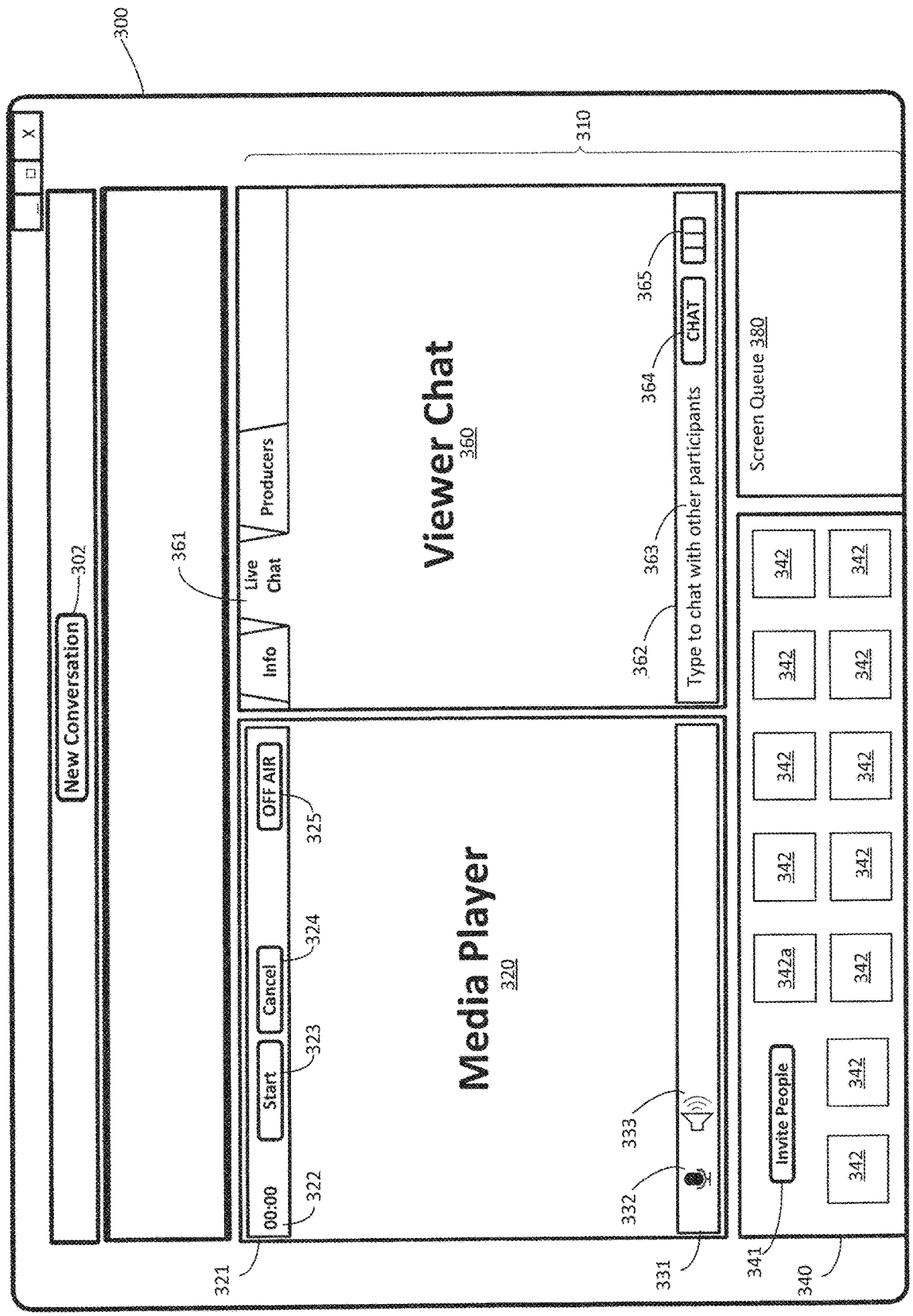
FIG. 4A illustrates a web page having multiple frames for producing a video-based group conversation.

The dialog box 200 also includes an image field 205, where the creator can upload a picture or image using button 206, and a widget 207 for expanding the dialog box 200 to show optional fields. For example, FIG. 3B shows dialog box 200 with widget 207 having been selected to expand the dialog box 200 to show pull-down data field 208, where the creator can select a predefined category for the video-based group conversation, such as interview, comedy, music, etc.; data entry field 209, where the creator can enter a free-form textual description of the video-based group conversation; and data entry field 210, where the creator can enter tags that relate to the video-based group conversation in order to help populate search results. Once all the basic identifying information about the video-based group conversation has been entered in step 122, the video-based group conversation is saved in step 124 when the creator selects button 211, and new production web page 300 is presented to the creator in step 126 as shown in FIG. 4A. Although the video-based group conversation has been created at this point, the creator may not be ready to go live yet, and additional set-up may be required, as further discussed below.

However, since a description of the video-based group conversation has been stored, this description may be made publically accessible and searchable if it is designated as "public," or alternatively, it may be included in a list of video-based group conversations in a specified directory.

3. Producing the Video-Based Group Conversation

A. Pre-Live Staging

As noted above, once the video-based group conversation has been created and basic identifying information saved in step 124 of FIG. 2, a production web page 300 is presented to the creator as shown in FIG. 4A for additional staging and set-up of the event, prior to starting the video-based group conversation. The production web page 300 is generated at the creator's computing device from a web page template stored on the server 20. The web page 300 is configured with a production control area 310 having four distinct sections or frames—media player section 320, video preview area 340, viewer chat section 360, and screen queue 380. Further, each section 320, 340, 360, 380 is configured with its own set of controls, as further described below. In accord with one embodiment, some of the production features can be enabled for the creator, and disabled for all other participants. In another embodiment, some or all of the production features can be shared or assigned by the creator to one or more participants who then become co-producers. In one embodiment, the web page 300 also includes a button 302 configured for initiating a new video-based group conversation.

Media player section 320 is configured to receive and display an integrated streaming video signal and an integrated streaming audio signal from the video-based group conversation service 22. The video-based group conversation service 22 receives multiple video and audio feeds from multiple users as selected by the creator or any co-producer. For example, multiple users may be viewers and/or participants as further described below, and viewers may be selected by the producer as on-screen participants in the group conversation. The selected viewers/participants have the video and audio feed from the camera and microphone of their computing device streamed to the video-based group conversation service 22. The video-based group conversation service then makes these streams available so that the other participants can subscribe to them allowing for viewing them and/or listening to them. In one embodiment, the video-based group conversation service integrates multiple video and audio feeds from multiple selected viewers/participants into a single combined video signal and a single combined audio signal that is streamed to the media player section of web page 300 when the video-based group conversation event is live.

Media player section 320 is also configured with a first control ribbon 321 on the top of the media player section and a second control ribbon 331 on the bottom of the media player section. The first control ribbon includes an elapsed time counter 322, a first control button 323 labeled "START" and a second control button 324 entitled "CANCEL." The elapsed time counter 322 starts when video-based group conversation is started and indicates the elapsed time of the event. Selecting the first button 323 starts the video-based group conversation while selecting the second button 324 cancels the video-based group conversation. The first control ribbon 321 is also configured with a widget 325 having two states: the widget displays the text "OFF AIR," for example, in white letters on a black background, when the video-based group conversation is not being viewed, and the widget displays the text "ON AIR," for example, in white letters on a red background, when the video-based group conversation is being viewed. Additional controls such as buttons or widgets can be configured in the first control ribbon 321 for other control features. For example, if the video-based group conversation is designated as public, then a button to share the video-based group conversation on a social networking site may also be configured (not shown).

The second control ribbon 331 is configured with a first control widget 332 labeled "VOLUME" and a second control widget 333 entitled "MIC." Selecting the MIC widget 333 turns the creator's microphone input from on to off or vice versa and allows the creator to control the gain on his or her microphone, while selecting the VOLUME widget 332 allows the creator to increase or decrease the audio level coming out of the creator's speakers. Additional controls such as buttons or widgets can be configured in the second control ribbon 331 for other control features. For example, the producer's video feed may be displayed in a third widget (not shown), and the producer may choose to include his video feed on-screen or not.

Preview section 340 is configured with a button 341 labeled "INVITE PEOPLE." The creator may invite other participants to join the creator for the video-based group conversation. If the video-based group conversation has been designated as public or unlisted, the creator may simply share the URL with others. If, on the other hand, the video-based group conversation is designated as private, the creator must provide email addresses for all invitees to the system using the INVITE PEOPLE button 341, which causes the service to display a dialog box with entry fields for email addresses.

Figure 4B:
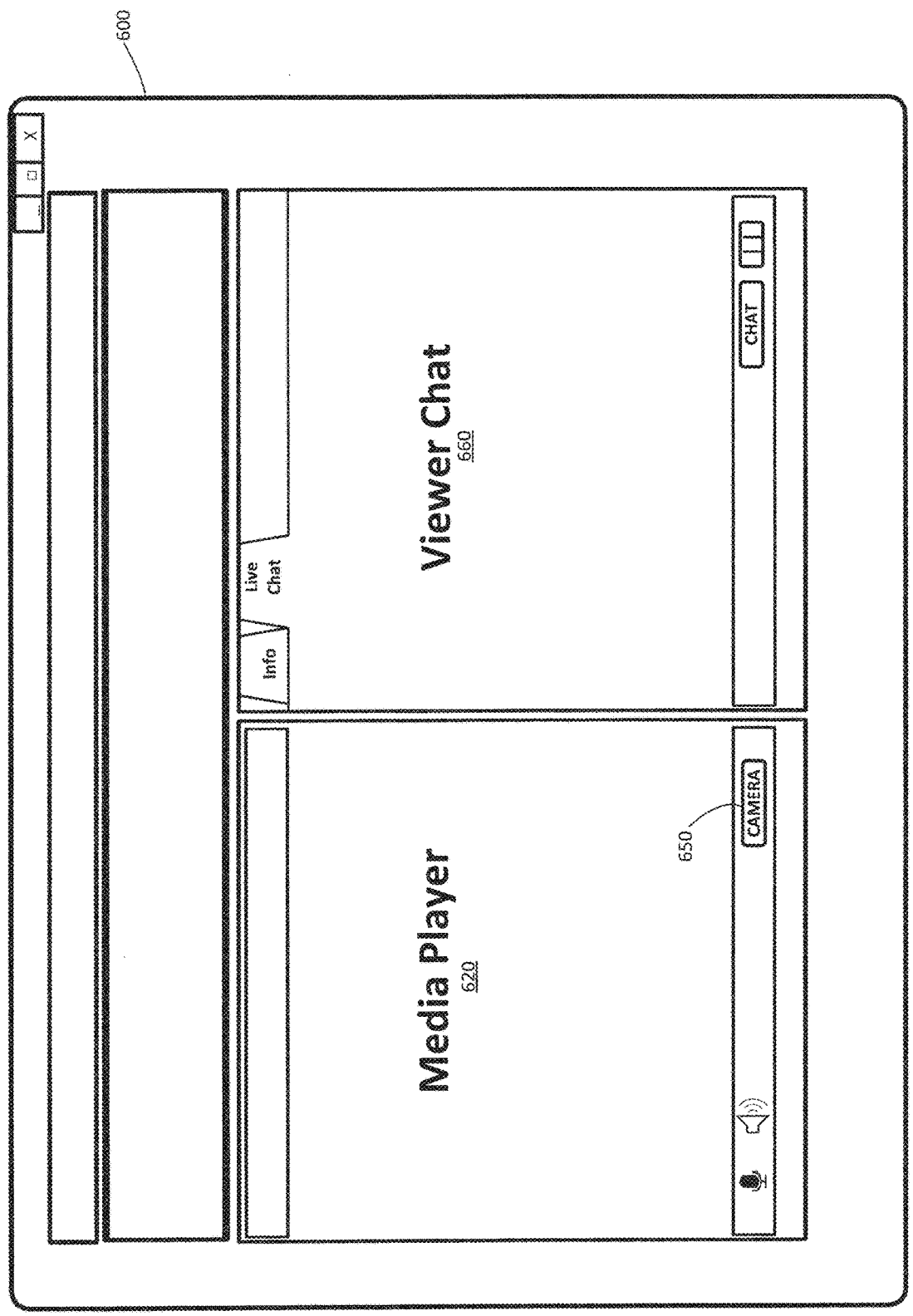
FIG. 4B illustrates a web page having multiple frames for viewing a video-based group conversation.

When other participants join the video-based group conversation by entering the URL or clicking on the link in their email invitation, a production web page 600 is presented to the participants as illustrated in FIG. 4B. The web page 600 that is presented to the participants will also have a media player 620 and a viewer chat area 660 similar to that described above, but will not have all of the control features described herein (i.e., START button, CANCEL button, etc.). Importantly, the participants web page 600 has a "CAMERA" button 650 that allows each participant to request to join the group conversation on camera.

Preview section 340 on the creator's web page 300 also contains a number of discrete thumbnail-sized images 342 that represent each person who is present in the video-based group conversation. The creator and any co-producer may click on any of the thumbnails 342 to access additional controls 342*a* that are specific to that participant. These controls 342*a* can include widgets to invite the participant to join on camera, to ban the participant from the video-based group conversation, and to privately text chat with such participant.

Figure 5A:
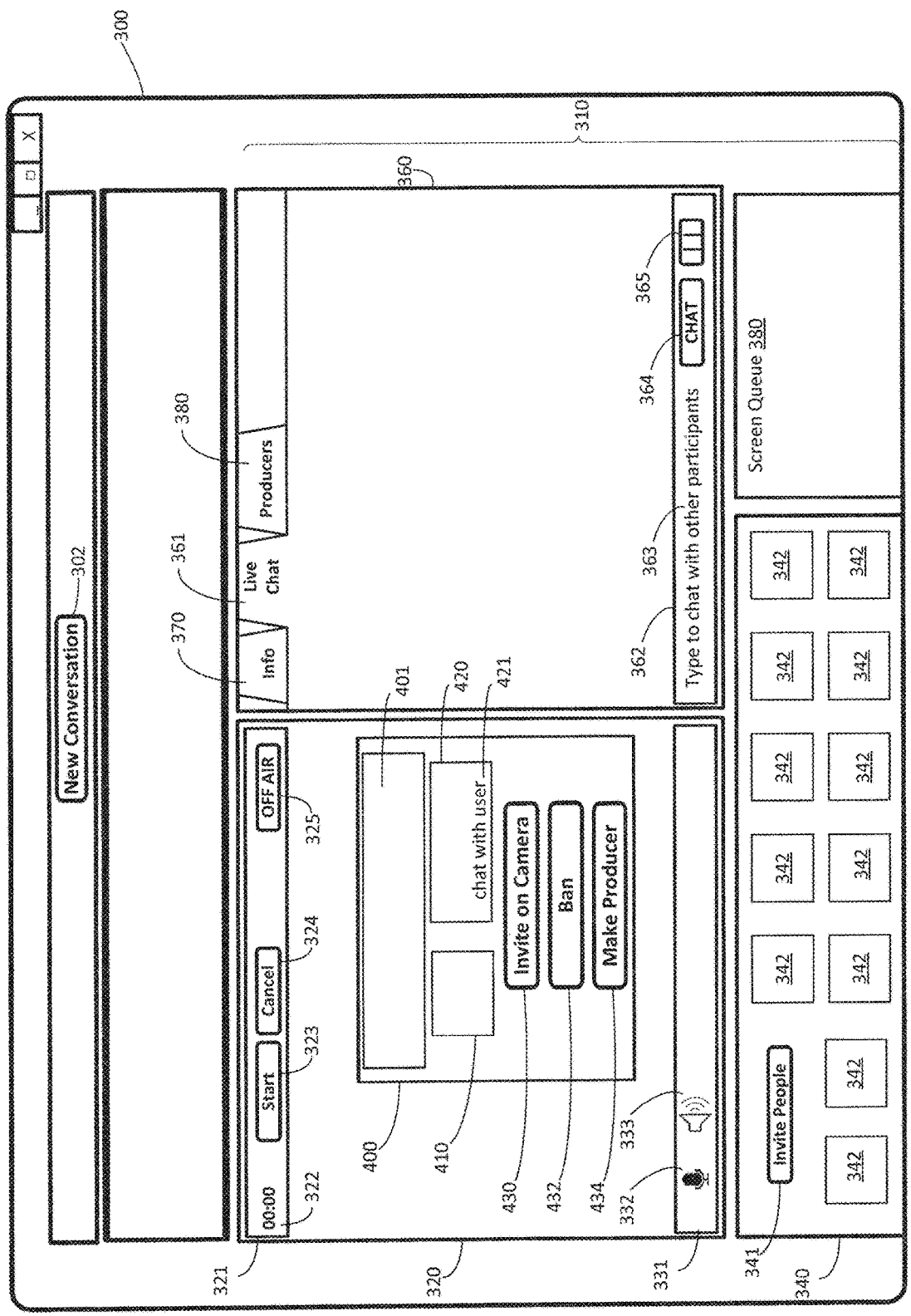
FIG. 5A illustrates the web page of FIG. 4A that presents a pop-up dialog for inviting another user to participate on-screen in the video-based group conversation.

For example, by rolling a computer mouse or other selection device over one of the thumbnail images, and clicking on it, a pop-up display 400 (or "facecard") is presented to the producer on top of web page 300, as illustrated in FIG. 5A. The pop-up display 400 is configured with a top panel 401 that includes identifying information for the selected participant as well as several control buttons including button 430 labeled "INVITE ON CAMERA," a button 432 labeled BAN" and a button 434 labeled "MAKE PRODUCER.".

The BAN button 432 is configured to allow the creator or co-producer to remove a participant from the video-based group conversation. For example, when the BAN button 432 is selected by a producer while viewing a participant's facecard, the participant's web browser or mobile application can be refreshed to return to a home page or home screen. If the participant attempts to go back to the URL or mobile application for the video-based group conversation, the system can deliver a message to the participant saying that the video-based group conversation is not accessible.

The MAKE PRODUCER button 434 is configured button to allow the creator or co-producer to designate that participant as a co-producer. For example, if the MAKE PRODUCER button 434 is selected by the creator or a co-producer, the participant's web browser or mobile application can be refreshed and a new template sent to that participant that shows the producer's view and has a least a limited set, and possibly a full set of associated producer controls.

Figure 5B:
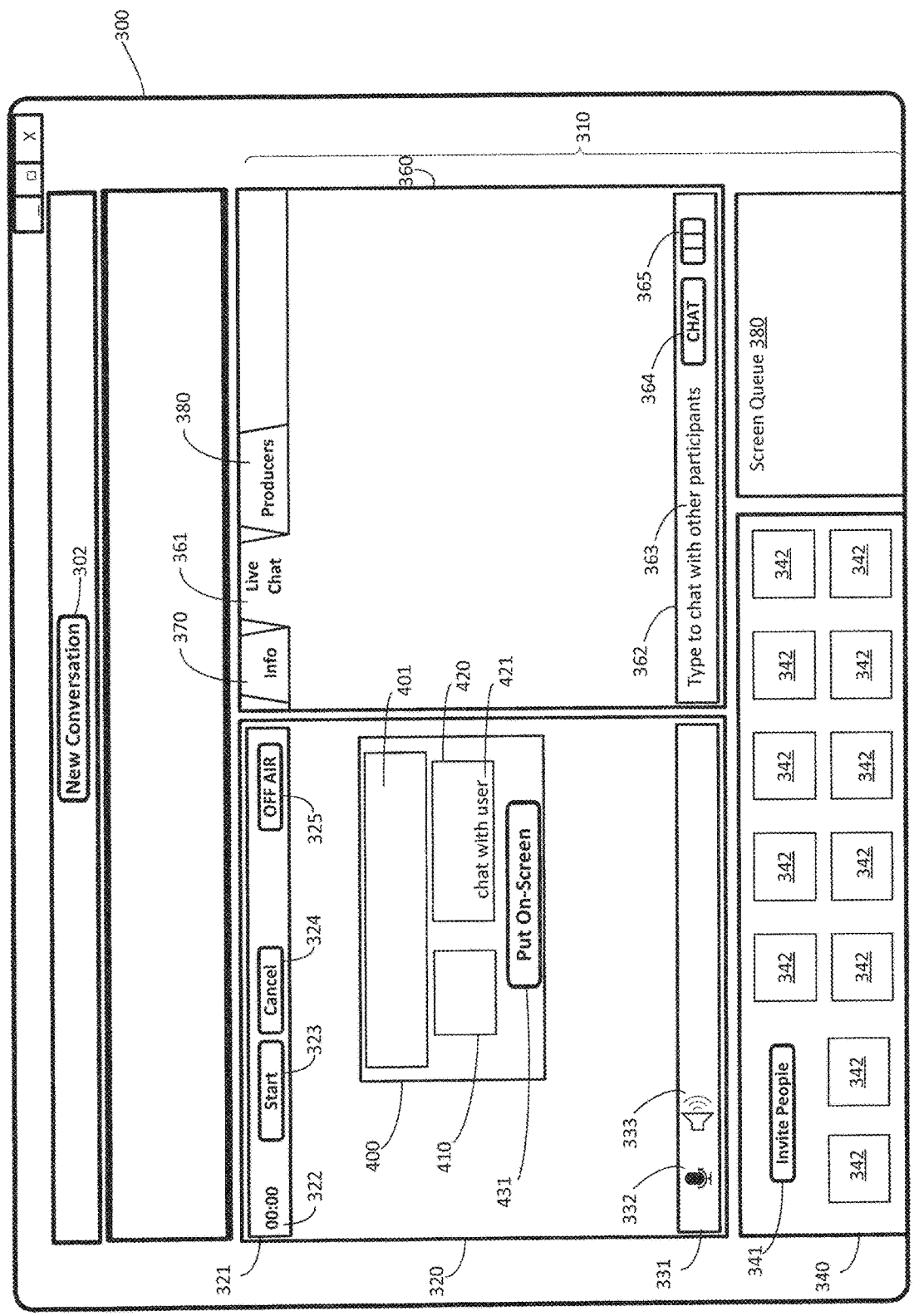
FIG. 5B illustrates the web page of FIG. 5A that presents a pop-up dialog for putting another user on-screen in the video-based group conversation.

When the INVITE ON CAMERA button 430 is selected by the creator or a producer, a corresponding pop-up window is displayed on the selected participant's computing device (not shown) with buttons configured to accept or reject the invitation to be on-screen, as described further below. If the invitation to be on-screen is accepted by the user, the button 430 of pop-up window 400 will be modified and presented as button 431 shown on FIG. 5B to display the label "PUT ON SCREEN." Any producer may continue to chat with the participant in a private text chat area 421. When the creator or producer finally selects button 431, the participant's video and audio feed will be integrated into the live video-based group conversation being viewed on the media player section 620 of web page 600 for all participants. If a participant is invited on camera by a producer or if a participant requests to join on camera-(as described earlier) the pop-up display 400 will include a video preview panel 410 that receives and displays the viewer's individual video feed and a private chat window 420 where the selected viewer and producer can chat privately.

The viewer chat section 360 of web page 300 is configured primarily as a text chat or message window for the video-based group conversation, with a tab 361 at the top of the chat section for selecting the chat section. Chats from the participants will be streamed into the chat window 360 and viewable by all participants. A control ribbon 362 is configured at the bottom of the chat section 360 to have a data entry field 363 for entering text. A first button 364 labeled "CHAT" is configured in the control ribbon 362. When the button 364 is selected, the text entered into field 363 is moved into the chat window 360. A second button 365 has the standard symbol for "PAUSE" and when selected, pauses the active state for the chat window for that user.

Figure 5C:
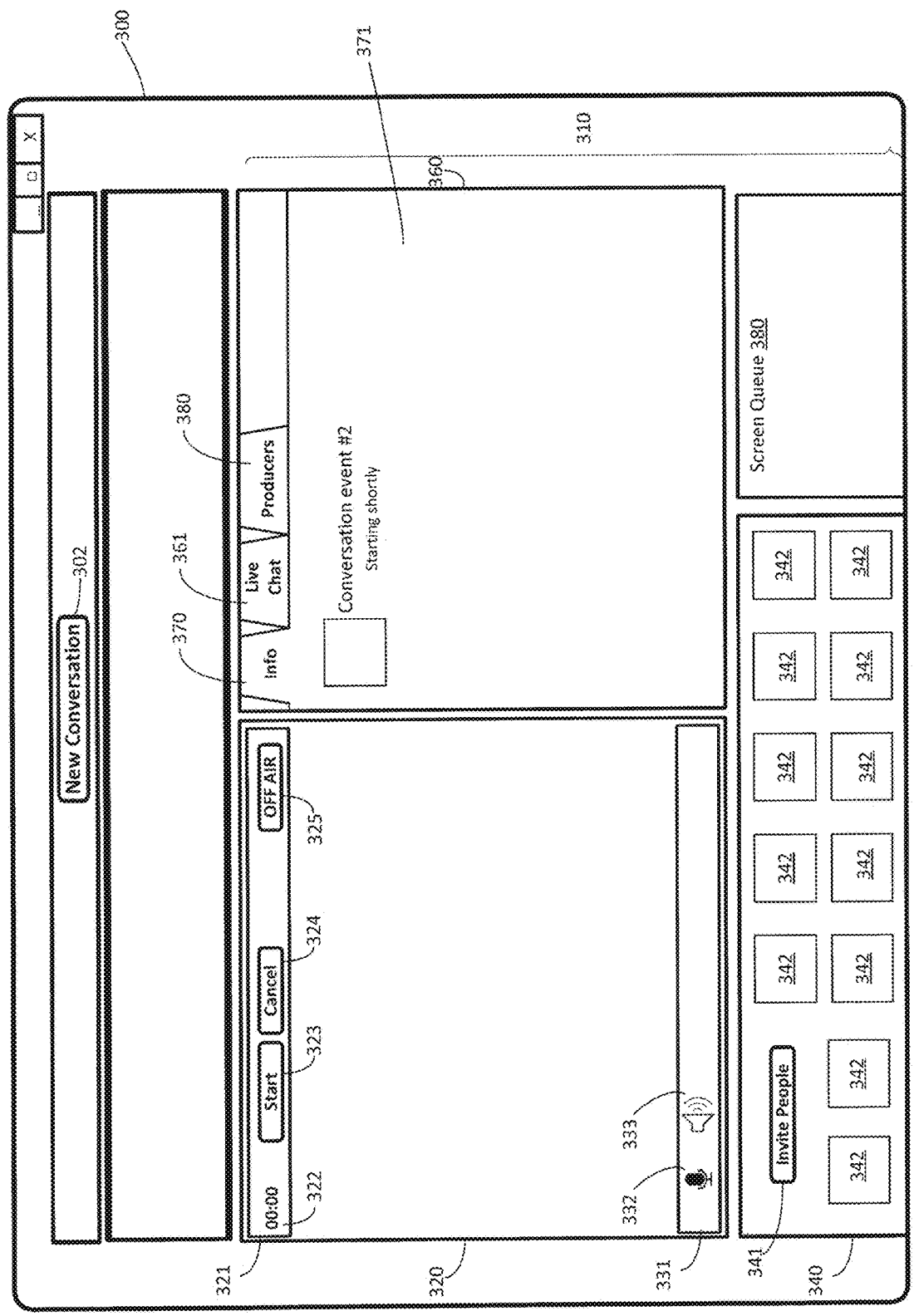
FIG. 5C illustrates the web page of FIG. 4A with another tab for event information in the chat window.
Figure 5D:
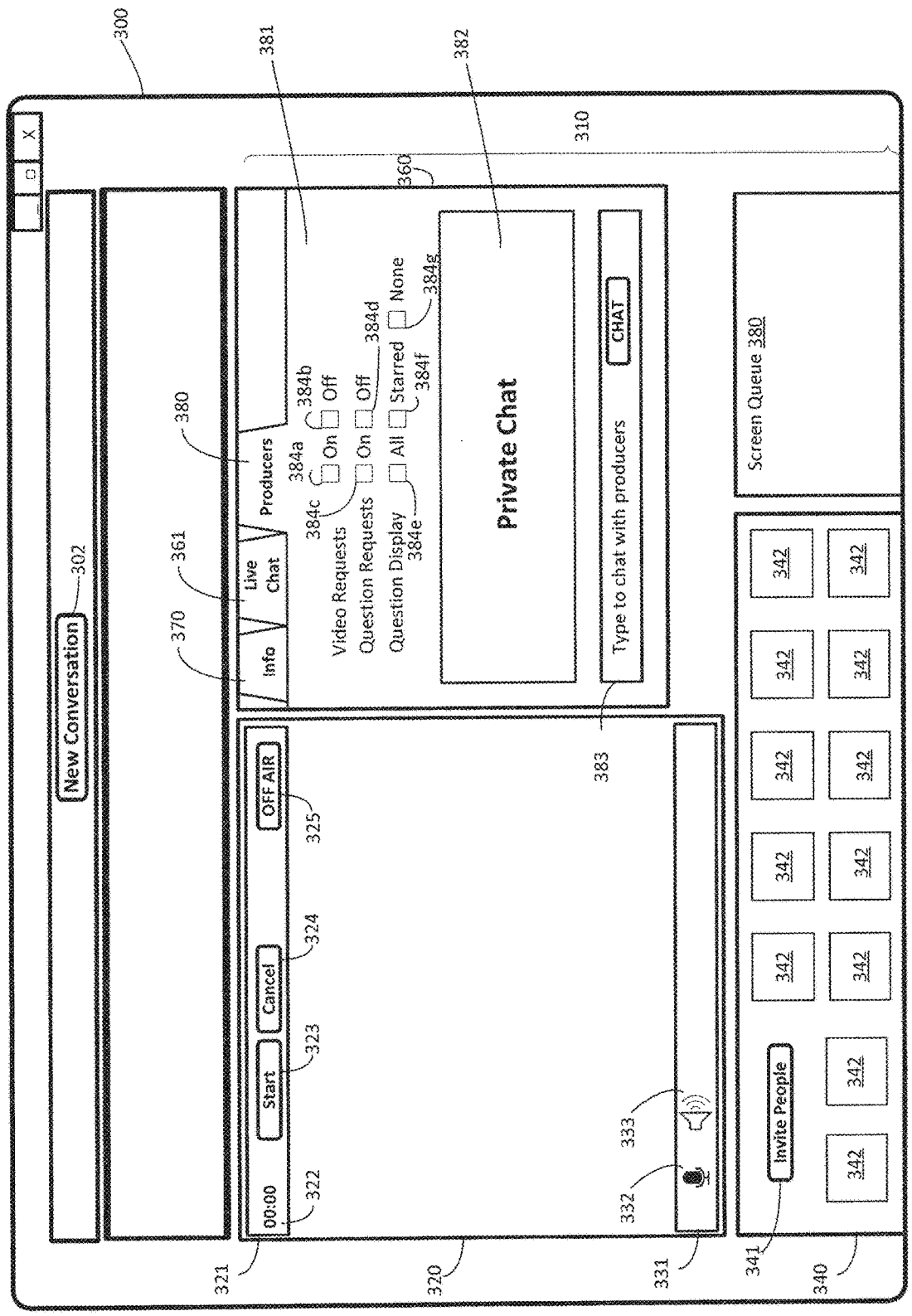
FIG. 5D illustrates the web page of FIG. 4A with another tab for producer interaction in the chat window.

The chat window 360 includes tab 370 labeled "INFO" and tab 380 labeled "PRODUCERS." The PRODUCERS tab 380 is only visible to the creator and co-producers. Selecting the INFO tab 370 reveals another window 371 that is configured to display the information about the video-based group conversation, as shown in FIG. 5C. Selecting the PRODUCERS tab 380 reveals another window 381 that is configured with a chat window 382, a data entry field 383 for entering chat text, and a group of widgets 384*a*-384*g* for enabling or disabling various control settings for the producer, as shown in FIG. 5D. For example, selecting widget 384*a* allows any participant to request to join on camera, while selecting widget 384*b* disables video requests from other users. Selecting widget 384*c* allows any participant to ask text based questions and submit external media (i.e. videos, photos, slide decks, etc.), while selecting widget 384*d* disables question and extremal media submissions from participants. Widgets 384*e*. 384*f* and 384*g* allow the creator or any producer to control which questions and external media submissions am displayed to the participants.

Figure 4C:
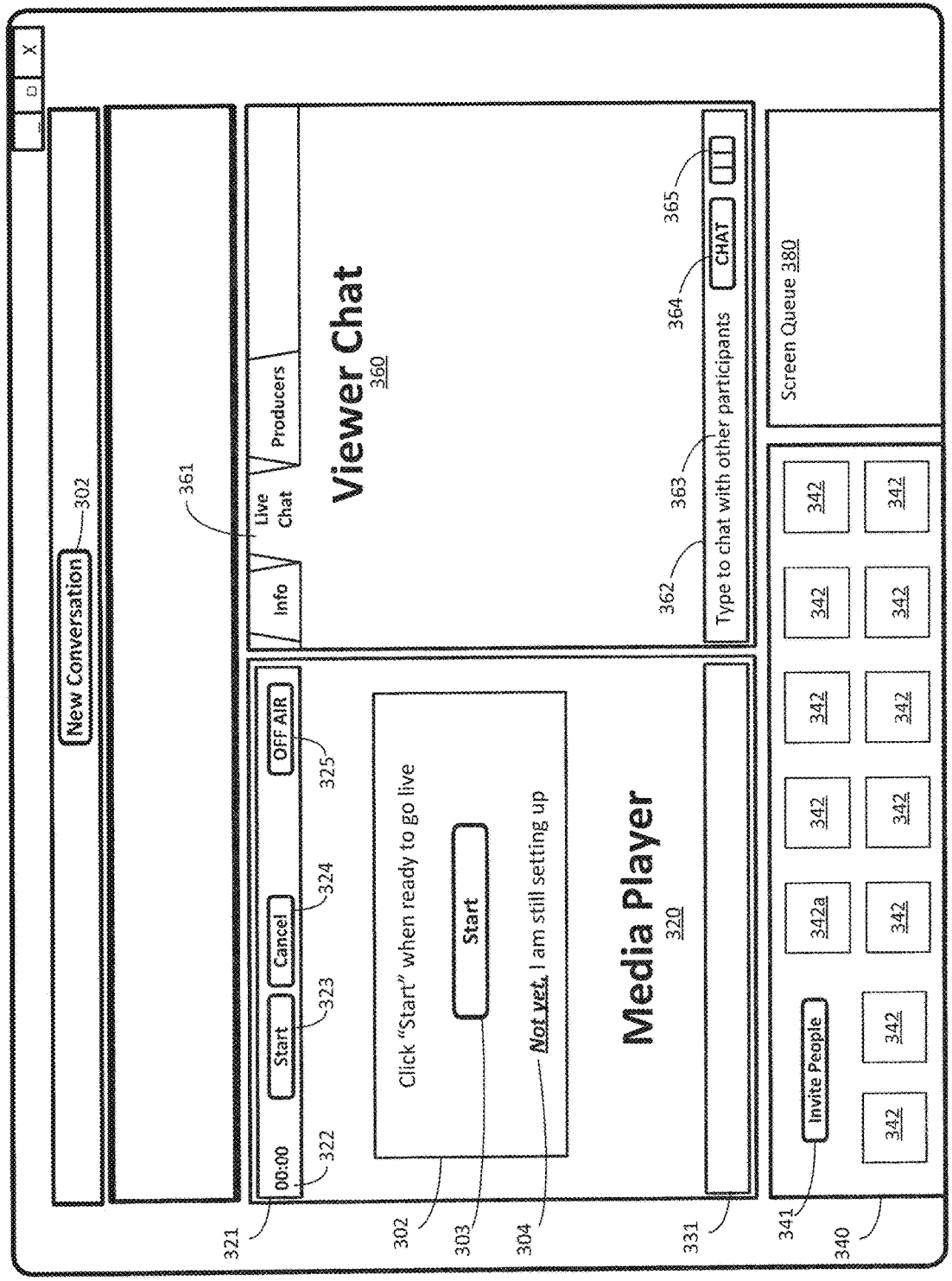
FIG. 4C illustrates the web page of FIG. 4A that presents a pop-up dialog to confirm that the user wants to start the video-based group conversation.

In one embodiment, the initial display of the production web page 300 includes a pop-up dialog 302 presented over the web page with a first button or link 303 that may be selected to start the video-based group conversation, and a second button or link 304 that may be selected to continue with set-up activities prior to starting the video-based group conversation, as shown in FIG. 4C. For example, selecting either button 303 or 304 removes the pop-up 302 so that the production web page 300 appears without the pop-up as in FIG. 4A.

B. Live Video-Based Group Conversation

Figure 6A:
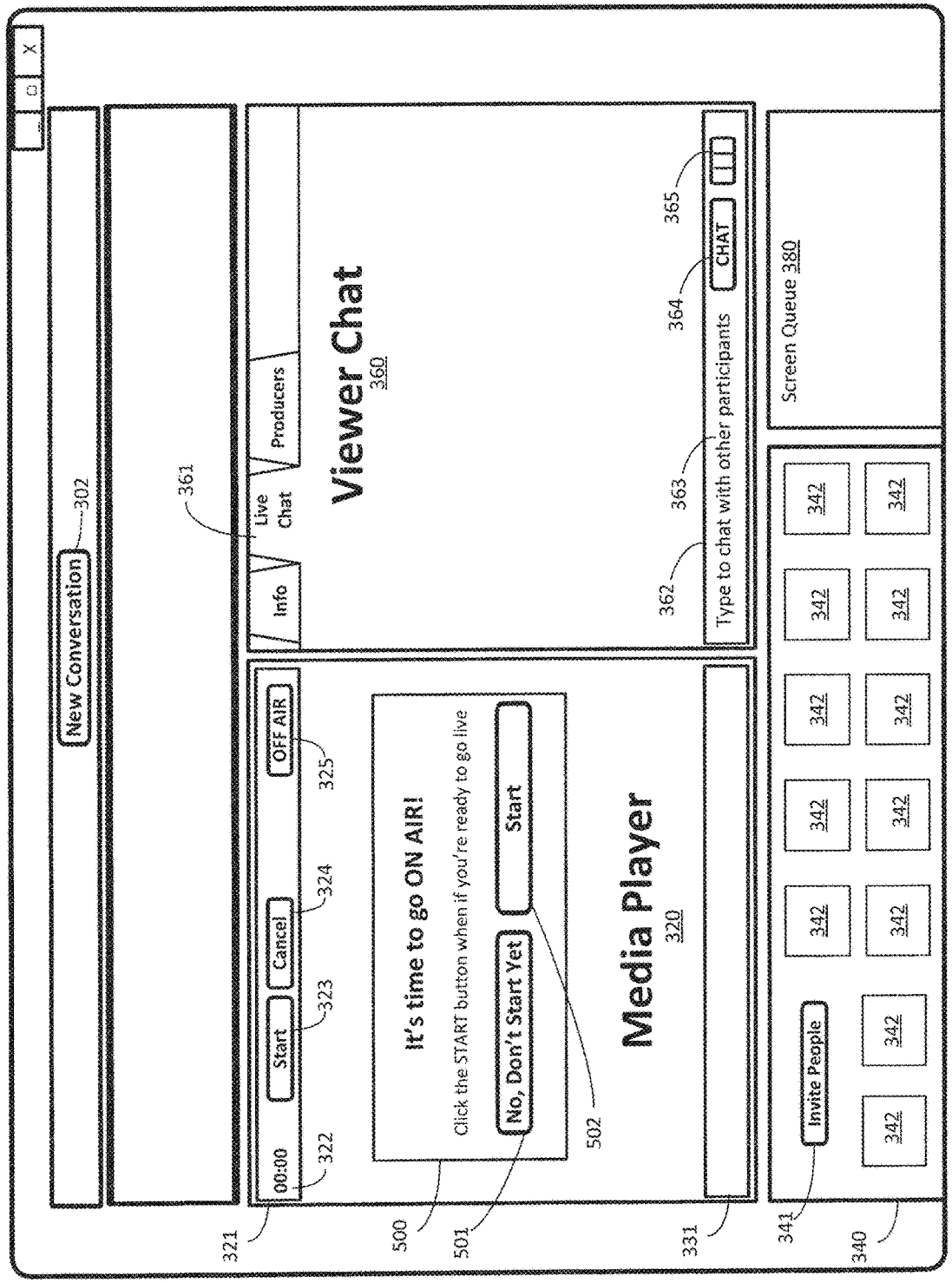
FIG. 6A illustrates the web page of FIG. 4A that presents a pop-up dialog for confirming the request to start the video-based group conversation.

When the producer has completed setting up the video-based group conversation, the START button 323 in the first control ribbon 321 of the media player section 320 is selected. Referring to FIG. 6A, in order to ensure that the creator or co-producer is ready to go live, selecting the START button 323 causes a pop-up dialog 500 to be displayed over the web page 300. The pop-up dialog 500 includes a first button 501 labeled "NO, DON'T START YET" and a second button 502 labeled "START." Thus, if the creator or co-producer is ready to go live, the START button 502 on pop-up dialog 500 is selected; if not, the NO, DON'T START YET button 501 is selected and the system returns to the set-up state.

Figure 6B:
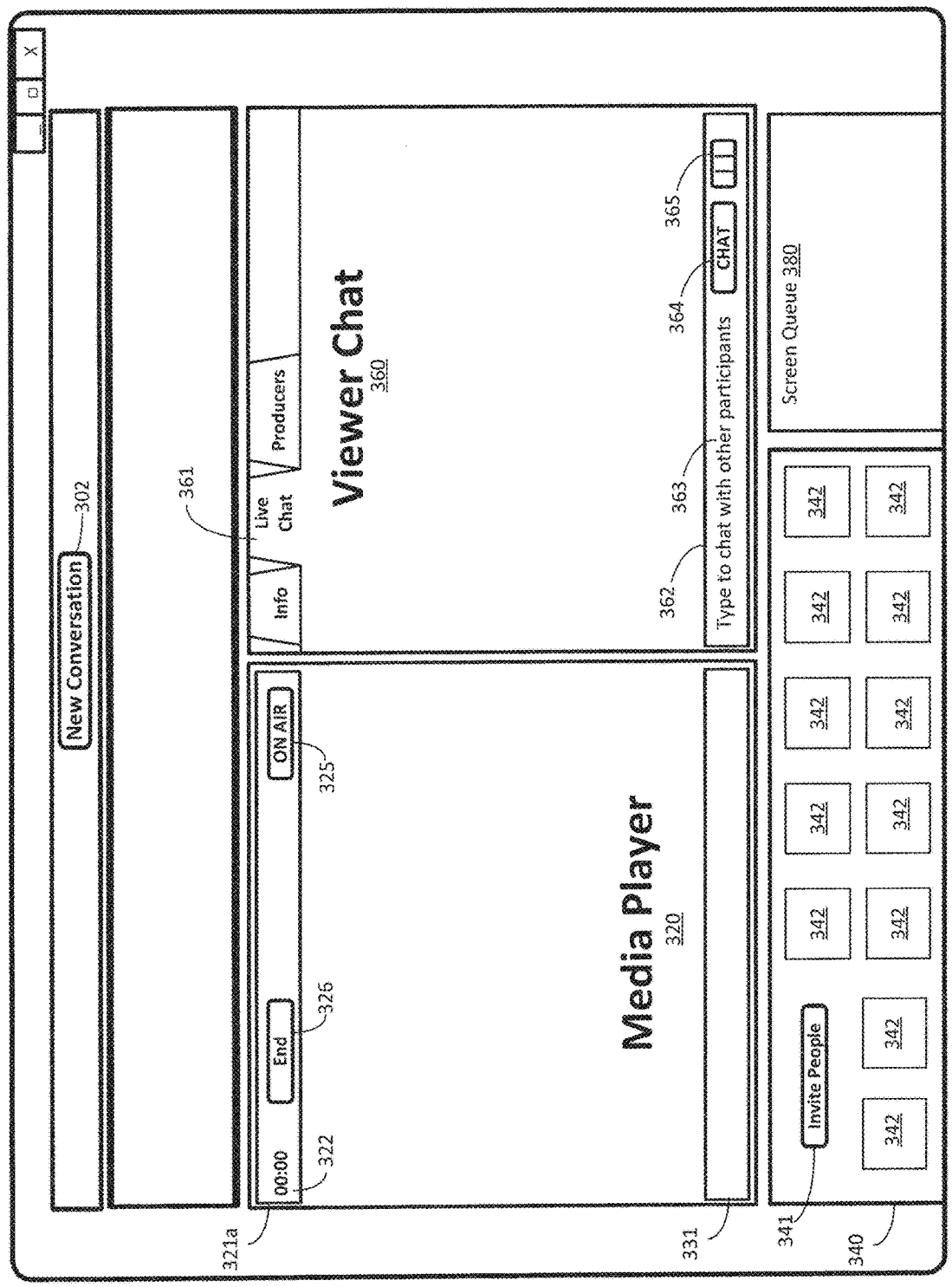
FIG. 6B illustrates the web page of FIG. 6A in a live state.

In the live state, the creator or co-producer can moderate the conversation using all the production controls described above. Further, the control ribbon 321 is replaced by control ribbon 321*a* shown in FIG. 6B, which is configured with button 325 changed to the ON AIR state, and buttons 323 and 324 removed and replaced with a single button 326 labeled "END."

Figure 6C:
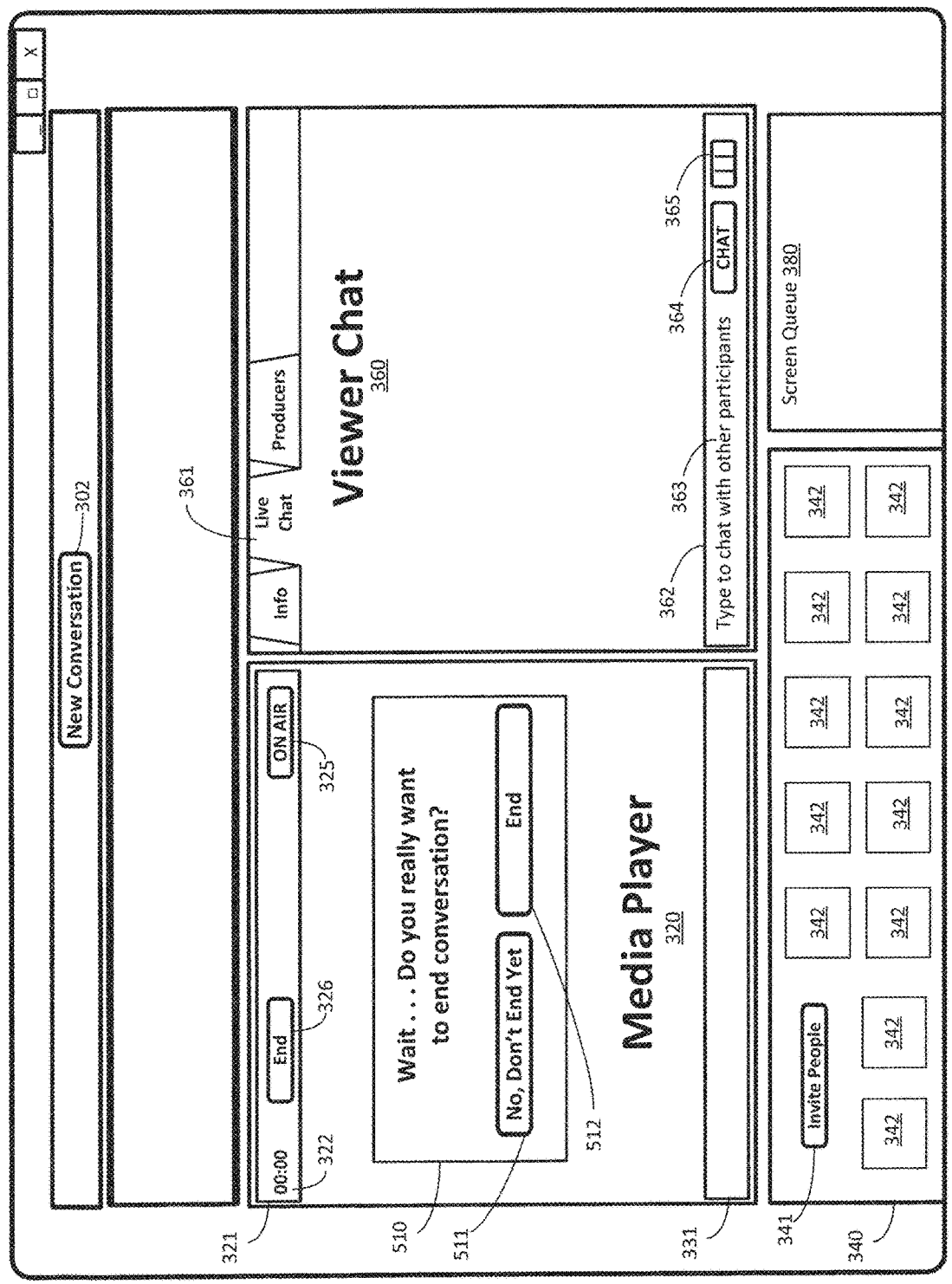
FIG. 6C illustrates the web page of FIG. 6B that presents a pop-up dialog for confirming the request to end the video-based group conversation.

When the creator or co-producer is ready to end the video-based group conversation, the END button 326 on control ribbon 321*a* is selected. This causes a pop-up dialog 510 to be displayed over the web page 300, as shown in FIG. 6C. The pop-up dialog 510 includes a first button 511 labeled "NO, DON'T END YET" and a second button 512 labeled "END." Thus, if the creator or co-producer is ready to end the video-based group conversation, the END button 512 on pop-up dialog 510 is selected, and if not, the NO, DON'T END YET button 511 is selected and the system continues with the live broadcast.

4. Searching for Video-Based Group Conversations

As noted above, if a video-based group conversation is designated as "public," its description may be accessible and searchable through a search input field or through any search engine. For example, a user may conduct a search to locate specific keywords, topics or persons of interest, and one or more video-based group conversations may be listed in the search results, regardless of whether the events are live, recorded or pre-live. The description of the video-based group conversation preferably includes a link to the URL for the video-based group conversation, and by selecting the link and/or navigating to that URL. If the video-based group conversation is live, the user may request or be invited to join as an on-screen participant.

In another embodiment, the web service generates a list or directory of all video-based group conversations, and the list could be made searchable with an indication as to status, i.e., whether the video-based group conversation is public or private. If the video-based group conversation is designated as "public," then a link or URL can be provided to take the user directly to the event. If the video-based group conversation is designated as "private," then a link to the event URL will not be provided, but a different link could be provided to request joining the event, or subscribing to the web service. Unlisted events will not be included in any list or directory.

In yet another embodiment, the web service can provide to authorized users the ability to create personalized or customized lists of video-based group conversations. For example, such a list may include all video-based group conversations to which a user has been invited, and any video-based group conversations that the user has flagged via a search. In another embodiment, the web service can allow the user to create automatic searches, or information feeds, based on keywords or other search criteria.

5. Embedded Distribution

Figure 7:
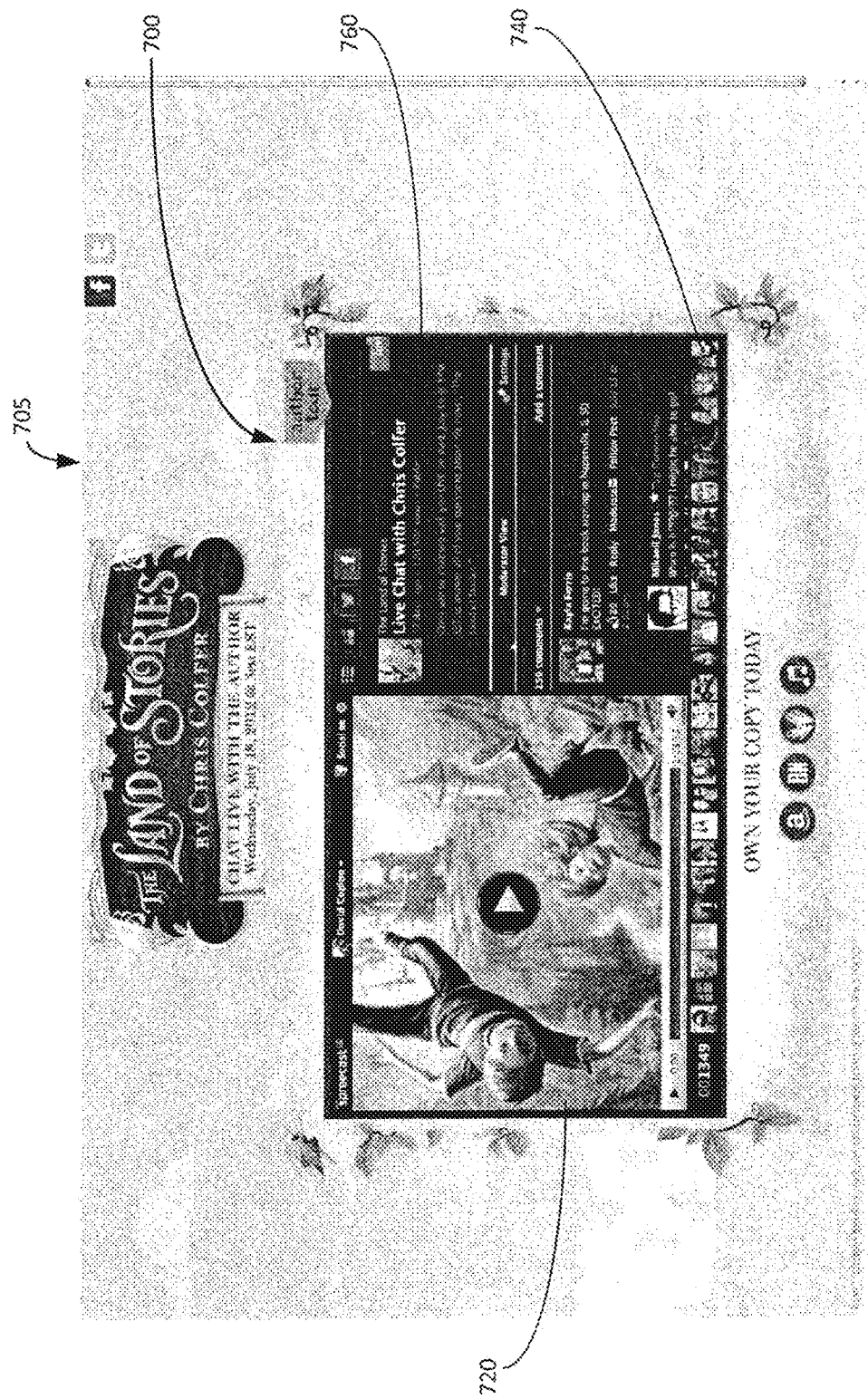
FIG. 7 illustrates a web page having an embedded application for a video-based group conversation.

FIG. 7 illustrates a production page 700 for video-based group conversations that can be embedded as a software tool into a web page 705 using a standard embedding technique such as an iframe. The embedded application allows the video-based group conversation to be embedded into a third party web page. Visitors who visit the third party webpage would be able to view and participate in the video-based group conversation. The production page 700 includes a media player 720, a video preview area 740, and a viewer chat section 760. Before the event begins, viewers can come to the web 705 page to RSVP. The embedded media player 720 automatically goes live once the video-based group conversation begins, and viewers can participate directly from the web site on which it is located, including video participation. Once the video-based group conversation ends, the media player 720 serves up the archive.

6. Conclusion

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method for establishing a video-based group conversation for transmission over a social networking platform to a plurality of members of the social networking platform, said method comprising:

receiving a request from a first user at a first mobile device to create a video-based group conversation accessible to the plurality of members of the social networking platform, wherein each member who joins the video-based group conversation is at least one of a video-feed-receiving member or a video-feed-contributing member, where the video-feed-receiving member is a member who has permission to view a video feed of the video-based group conversation but not to contribute to the video feed and where the video-feed-contributing member has permission to view the video feed and to contribute to the video feed;

prior to the video-based group conversation transpiring, displaying, in a user interface of the first mobile device, a countdown indicator that indicates when the video-based group conversation is to start, wherein the user interface further includes a start element that triggers the start of the video-based group conversation as counted down by the countdown indicator, and wherein the start element is displayed simultaneously with one or more thumb-nail sized images corresponding to one or more of the members of the social networking platform;

in response to the video-based conversation transpiring, presenting, on the user interface, a first video signal associated with the video-based group conversation in conjunction with:

i) a first user interface element for controlling transmission of the first video signal, ii) a second user interface element that, when selected by the first user, triggers an invitation to be sent to a second user device of a second user, wherein the second user is initially determined to be a video-feed-receiving member, wherein the invitation invites the second user to become a video-feed-contributing member, resulting in the second user being able to contribute to the video feed by participating on-screen in the video-based group conversation, and wherein, in response to an acceptance of the invitation by the second user, the second user is caused to transition from being the video-feed-receiving member to being the video-feed-contributing member and is permitted to contribute to the video feed, and iii) a third user interface element is selectable by the first user to subsequently control participation of the second user; and transmitting the first video signal from the first mobile device to a server to enable streaming data between the server and respective mobile devices of the plurality of members of the social networking platform who join the video-based group conversation for simultaneous presentation thereto.

2. The method for establishing the video-based group conversation of claim 1, wherein the second user's participation on-screen in the video-based group conversation includes presenting a second video signal relating to the second user in conjunction with the first video signal on a display of the first mobile device.

3. The method for establishing the video-based group conversation of claim 2, wherein the second video signal is displayed in conjunction with the first video signal and is simultaneously presented on a respective display of each of the respective mobile devices of the plurality of members of the social networking platform who join the video-based group conversation.

4. The method for establishing the video-based group conversation of claims, wherein the second user is a member of the social networking platform having a second mobile device joined to the video-based group conversation; and wherein the second video signal comprises a live video stream from the second mobile device of the second user.

5. The method for establishing the video-based group conversation of claim 3, wherein the first and second video signals are integrated into a combined video signal and simultaneously presented on the respective displays of the mobile devices of the members of the social networking platform who join the video-based group conversation.

6. The method for establishing the video-based group conversation of claim 1, wherein the second user interface element for inviting the second user comprises a plurality of respective images representing at least a subset of the plurality of members of the social networking platform who join the video-based group conversation, each of the respective images being selectable to invite a corresponding one of the plurality of members to participate on-screen in the video-based group conversation.

7. The method for establishing the video-based group conversation of claim 1, further comprising presenting a viewer chat area to each of the plurality of members of the video-based group conversation, the viewer chat area including a data entry field for entering text, graphics, images, or a combination thereof.

8. The method for establishing the video-based group conversation of claim 1, further comprising presenting text, graphics, and images simultaneously with the presentation of the first video signal to the first user mobile device.

9. The method for establishing the video-based group conversation of claim 8, wherein the text, graphics, and images are simultaneously presented on respective displays of the respective mobile devices of the plurality of members of the social networking platform who join the video-based group conversation.

10. The method for establishing the video-based group conversation of claim 1, wherein the first video signal comprises a live video stream from the first user mobile device.

11. The method for establishing the video-based group conversation of claim 1, wherein the first video signal comprises video programming content obtained from an external media source.

12. The method for establishing the video-based group conversation of claim 1, wherein receiving the request from the first user to create the video-based group conversation further comprises receiving the request by the server.

13. The method for establishing the video-based group conversation of claim 1, wherein the first user can specify whether to make the video-based group conversation only privately available.

14. The method of claim 1 wherein the social networking platform is a same social networking platform for each of the first user and the second user, and said video-based group conversation is viewable by any member of said same social networking platform.

15. The method of claim 14, wherein said video-based group conversation is viewable only by members of said same social networking platform.

16. The method of claim 1, wherein, after the acceptance of the invitation by the second user, the second user is permitted to participate in the video-based group conversation only after the third user interface element is subsequently selected by the first user such that, despite the second user accepting the invitation, a restriction is still placed on an ability of the second user to participate in the video-based group conversation until such time as the third user interface element is selected.

17. The method of claim 1, wherein the method further includes:

scheduling, via the user interface of the first mobile device, the video-based group conversation to start at a specified date and time; and prior to the specified date and time for the video-based group conversation transpiring, displaying the countdown indicator, which indicates when the video-based group conversation is to start.

18. A system for producing a video-based group conversation for transmission over a social networking platform, said system comprising:

a server comprising a processor configured to execute instructions;

a memory coupled to the server and comprising stored instructions that are executable by the processor to cause the server to:

receive a request from a first user at a first mobile device to create a video-based group conversation accessible to a plurality of members of a social networking platform, wherein each member who joins the video-based group conversation is at least one of a video-feed-receiving member or a video-feed-contributing member, where the video-feedreceiving member is a member who has permission to view a video feed of the video-based group conversation but not to contribute to the video feed and where the video-feed-contributing member has permission to view the video feed and to contribute to the video feed;

prior to the video-based group conversation transpiring, display, in a user interface of the first mobile device, a countdown indicator that indicates when the video-based group conversation is to start, wherein the user interface further includes a start element that triggers the start of the video-based group conversation as counted down by the countdown indicator, and wherein the start element is displayed simultaneously with one or more thumb-nail sized images corresponding to one or more of the members of the social networking platform;

in response to the video-based conversation transpiring, present, on the user interface, a first video signal associated with the video-based group conversation in conjunction with:
  i) a first user interface element for controlling transmission of the first video signal,
  ii) a second user interface element that, when selected by the first user, triggers an invitation to be sent to a second user device of a second user, wherein the second user is initially determined to be a video-feed-receiving member, wherein the invitation invites the second user to become a video-feed-contributing member, resulting in the second user being able to contribute to the video feed by participating on-screen in the video-based group conversation, and wherein, in response to an acceptance of the invitation by the second user, the second user is caused to transition from being the video-feed-receiving member to being the video-feed-contributing member and is permitted to contribute to the video feed, and
  iii) a third user interface element is selectable by the first user to subsequently control participation of the second user;

receive the first video signal from the first mobile device; and stream the first video signal to respective mobile devices of the plurality of members of the social networking platform who join the video-based group conversation for simultaneous presentation thereto.

19. The system of claim 18, wherein the stored instructions are further executable by the processor to cause the server to:

integrate a second video signal from the second user device with the first video first video signal as a combined video signal; and stream the combined video signal to the respective mobile devices of the plurality of members of the social networking platform for simultaneous presentation thereto.

20. The system of claim 18, wherein:

after the second user accepts the invite, both a visual appearance of the second user interface element and a functionality of the second user interface element changes such that the second user interface element transitions to become the third user interface element and such that the third user interface element is not displayed until after the second user accepts the invite, and after the second user accepts the invite, the second user is still prevented from participating in the video-based group conversation until after a time when the third user interface element is selected such that, despite the second user accepting the invitation, the second user is still prevented from participating until after the third user interface element is selected by the first user.

\* \* \* \* \*